United States Patent
Kang et al.

(10) Patent No.: US 9,946,421 B2
(45) Date of Patent: Apr. 17, 2018

(54) MOBILE TERMINAL WITH MULTIPLE DRIVING MODES AND CONTROL METHOD FOR THE MOBILE TERMINAL

(71) Applicant: LG ELECTRONICS INC., Seoul (KR)

(72) Inventors: Munseok Kang, Seoul (KR); Sungchun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/040,500

(22) Filed: Feb. 10, 2016

(65) Prior Publication Data

US 2017/0075448 A1    Mar. 16, 2017

(30) Foreign Application Priority Data

Sep. 15, 2015    (KR) .......................... 10-2015-0130567

(51) Int. Cl.
  *G06F 3/044*    (2006.01)
  *G06F 3/047*    (2006.01)
  *G06F 3/041*    (2006.01)

(52) U.S. Cl.
  CPC .............. *G06F 3/044* (2013.01); *G06F 3/047* (2013.01); *G06F 3/0412* (2013.01);
  (Continued)

(58) Field of Classification Search
  CPC ........... G06F 3/044; G06F 2203/04107; G06F 2203/04111; G06F 2203/04112
  See application file for complete search history.

(56) References Cited

U.S. PATENT DOCUMENTS

2012/0056835 A1*  3/2012  Choo .................... G06F 3/0412
                                                    345/173
2013/0050116 A1*  2/2013  Shin ....................... G06F 3/044
                                                    345/173
(Continued)

FOREIGN PATENT DOCUMENTS

CN         104461198        3/2015
EP         2 511 804        10/2012
WO       WO 2015/072722     5/2015

OTHER PUBLICATIONS

European Search Report dated Feb. 8, 2017 issued in Application No. 16000897.5.
(Continued)

*Primary Examiner* — Sanghyuk Park
(74) *Attorney, Agent, or Firm* — KED & Associates, LLP

(57) ABSTRACT

The present disclosure relates to a mobile terminal and a control method thereof. A mobile terminal according to the present disclosure may include a display unit provided with an electrode layer having a plurality of nodes, and a display layer configured to receive power from the electrode layer and display visual information, a touch sensor disposed to overlap with the display layer to sense a touch input using the electrode layer, and a controller configured to control power supplied to the electrode layer to control the display unit and the touch sensor, wherein the driving mode of the touch sensor includes a first driving mode in which the plurality of nodes are simultaneously turned on to sense the touch input, and a second driving mode in which the plurality of nodes are sequentially turned on to detect the coordinate of the touch input when the touch input is sensed.

21 Claims, 11 Drawing Sheets

(52) U.S. Cl.
CPC .. *G06F 3/0416* (2013.01); *G06F 2203/04106* (2013.01); *G06F 2203/04108* (2013.01); *G06F 2203/04803* (2013.01)

(56) References Cited

U.S. PATENT DOCUMENTS

| | | | |
|---|---|---|---|
| 2013/0278624 A1 | 10/2013 | Abe | |
| 2014/0210780 A1* | 7/2014 | Lee | G06F 3/03545 |
| | | | 345/174 |
| 2014/0375608 A1* | 12/2014 | Yumoto | G06F 3/041 |
| | | | 345/174 |
| 2015/0075959 A1 | 3/2015 | Lu et al. | |
| 2015/0077370 A1 | 3/2015 | Kim et al. | |
| 2015/0109218 A1 | 4/2015 | Satou | |
| 2015/0109250 A1 | 4/2015 | Chang et al. | |
| 2015/0378508 A1* | 12/2015 | Kim | G06F 3/044 |
| | | | 345/174 |

OTHER PUBLICATIONS

European Search Report dated Dec. 14, 2017, issued in Application No. 16000897.5.

\* cited by examiner (a)  (b)

FIG. 4B

| MUX1 | MUX2 | MUX3 | MUX4 | MUX5 | MUX6 | MUX7 | MUX1 | MUX2 | MUX3 | MUX4 | MUX5 | MUX6 | MUX7 |
|---|---|---|---|---|---|---|---|---|---|---|---|---|---|
| 0 | 20 | 40 | 60 | 80 | 100 | 120 | 0 | 20 | 40 | 60 | 80 | 100 | 120 |
| 1 | 21 | 41 | 61 | 81 | 101 | 121 | 1 | 21 | 41 | 61 | 81 | 101 | 121 |
| 2 | 22 | 42 | 62 | 82 | 102 | 122 | 2 | 22 | 42 | 62 | 82 | 102 | 122 |
| 3 | 23 | 43 | 63 | 83 | 103 | 123 | 3 | 23 | 43 | 63 | 83 | 103 | 123 |
| 4 | 24 | 44 | 64 | 84 | 104 | 124 | 4 | 24 | 44 | 64 | 84 | 104 | 124 |
| 5 | 25 | 45 | 65 | 85 | 105 | 125 | 5 | 25 | 45 | 65 | 85 | 105 | 125 |
| 6 | 26 | 46 | 66 | 86 | 106 | 126 | 6 | 26 | 46 | 66 | 86 | 106 | 126 |
| 7 | 27 | 47 | 67 | 87 | 107 | 127 | 7 | 27 | 47 | 67 | 87 | 107 | 127 |
| 8 | 28 | 48 | 68 | 88 | 108 | 128 | 8 | 28 | 48 | 68 | 88 | 108 | 128 |
| 9 | 29 | 49 | 69 | 89 | 109 | 129 | 9 | 29 | 49 | 69 | 89 | 109 | 129 |
| 10 | 30 | 50 | 70 | 90 | 110 | 130 | 10 | 30 | 50 | 70 | 90 | 110 | 130 |
| 11 | 31 | 51 | 71 | 91 | 111 | 131 | 11 | 31 | 51 | 71 | 91 | 111 | 131 |
| 12 | 32 | 52 | 72 | 92 | 112 | 132 | 12 | 32 | 52 | 72 | 92 | 112 | 132 |
| 13 | 33 | 53 | 73 | 93 | 113 | 133 | 13 | 33 | 53 | 73 | 93 | 113 | 133 |
| 14 | 34 | 54 | 74 | 94 | 114 | 134 | 14 | 34 | 54 | 74 | 94 | 114 | 134 |
| 15 | 35 | 55 | 75 | 95 | 115 | 135 | 15 | 35 | 55 | 75 | 95 | 115 | 135 |
| 16 | 36 | 56 | 76 | 96 | 116 | 136 | 16 | 36 | 56 | 76 | 96 | 116 | 136 |
| 17 | 37 | 57 | 77 | 97 | 117 | 137 | 17 | 37 | 57 | 77 | 97 | 117 | 137 |
| 18 | 38 | 58 | 78 | 98 | 118 | 138 | 18 | 38 | 58 | 78 | 98 | 118 | 138 |
| 19 | 39 | 59 | 79 | 99 | 119 | 139 | 19 | 39 | 59 | 79 | 99 | 119 | 139 |

FIG. 8

| MUX1 | MUX2 | MUX3 | MUX4 | MUX5 | MUX6 | MUX7 | MUX1 | MUX2 | MUX3 | MUX4 | MUX5 | MUX6 | MUX7 |
|---|---|---|---|---|---|---|---|---|---|---|---|---|---|
| 0 | 20 | 40 | 60 | 80 | 100 | 120 | 0 | 20 | 40 | 60 | 80 | 100 | 120 |
| 1 | 21 | 41 | 61 | 81 | 101 | 121 | 1 | 21 | 41 | 61 | 81 | 101 | 121 |
| 2 | 22 | 42 | 62 | 82 | 102 | 122 | 2 | 22 | 42 | 62 | 82 | 102 | 122 |
| 3 | 23 | 43 | 63 | 83 | 103 | 123 | 3 | 23 | 43 | 63 | 83 | 103 | 123 |
| 4 | 24 | 44 | 64 | 84 | 104 | 124 | 4 | 24 | 44 | 64 | 84 | 104 | 124 |
| 5 | 25 | 45 | 65 | 85 | 105 | 125 | 5 | 25 | 45 | 65 | 85 | 105 | 125 |
| 6 | 26 | 46 | 66 | 86 | 106 | 126 | 6 | 26 | 46 | 66 | 86 | 106 | 126 |
| 7 | 27 | 47 | 67 | 87 | 107 | 127 | 7 | 27 | 47 | 67 | 87 | 107 | 127 |
| 8 | 28 | 48 | 68 | 88 | 108 | 128 | 8 | 28 | 48 | 68 | 88 | 108 | 128 |
| 9 | 29 | 49 | 69 | 89 | 109 | 129 | 9 | 29 | 49 | 69 | 89 | 109 | 129 |
| 10 | 30 | 50 | 70 | 90 | 110 | 130 | 10 | 30 | 50 | 70 | 90 | 110 | 130 |
| 11 | 31 | 51 | 71 | 91 | 111 | 131 | 11 | 31 | 51 | 71 | 91 | 111 | 131 |
| 12 | 32 | 52 | 72 | 92 | 112 | 132 | 12 | 32 | 52 | 72 | 92 | 112 | 132 |
| 13 | 33 | 53 | 73 | 93 | 113 | 133 | 13 | 33 | 53 | 73 | 93 | 113 | 133 |
| 14 | 34 | 54 | 74 | 94 | 114 | 134 | 14 | 34 | 54 | 74 | 94 | 114 | 134 |
| 15 | 35 | 55 | 75 | 95 | 115 | 135 | 15 | 35 | 55 | 75 | 95 | 115 | 135 |
| 16 | 36 | 56 | 76 | 96 | 116 | 136 | 16 | 36 | 56 | 76 | 96 | 116 | 136 |
| 17 | 37 | 57 | 77 | 97 | 117 | 137 | 17 | 37 | 57 | 77 | 97 | 117 | 137 |
| 18 | 38 | 58 | 78 | 98 | 118 | 138 | 18 | 38 | 58 | 78 | 98 | 118 | 138 |
| 19 | 39 | 59 | 79 | 99 | 119 | 139 | 19 | 39 | 59 | 79 | 99 | 119 | 139 |

(a)

MOBILE TERMINAL WITH MULTIPLE DRIVING MODES AND CONTROL METHOD FOR THE MOBILE TERMINAL

CROSS-REFERENCE TO RELATED APPLICATION

This application claims the benefit of priority of Korean Patent Application No. 10-2015-0130567, filed on Sep. 15, 2015, which is herein expressly incorporated by reference in their entireties.

BACKGROUND OF THE INVENTION

1. Field of the Invention

The present disclosure relates to a mobile terminal having a touch screen, thereby allowing to receive a touch input from a user.

2. Description of the Related Art

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In recent years, as various contents are provided for mobile terminals, the importance of a touch screen has been further recognized. Accordingly, a method of driving the touch screen has been developed in various ways. The method of driving the touch screen may include a method of sequentially driving a display unit and a sensor unit. As a result, a scheme of further enhancing a function of the touch screen in such a driving method is required.

For such a field of the technological development, as a function required for the touch screen, a faster response speed with respect to a touch input is required. Furthermore, due to the characteristics of the touch screen for providing information to a user and receiving an input from the user, a problem of consuming a lot of consumption power should be solved.

As a result, a scheme of reducing consumption power as well as enhancing a response speed on the touch screen will be taken into consideration.

SUMMARY OF THE INVENTION

An aspect of the present disclosure is to provide a mobile terminal capable of reducing the consumption power of the touch screen.

Another aspect of the present disclosure is to provide a control method of a touch screen capable of reducing power consumption, but enhancing a response speed with respect to a touch input.

A mobile terminal according to the present disclosure may include a display unit provided with an electrode layer having a plurality of nodes, and a display layer configured to receive power from the electrode layer and display visual information, a touch sensor disposed to overlap with the display layer to sense a touch input using the electrode layer, and a controller configured to control power supplied to the electrode layer to control the display unit and the touch sensor, wherein the driving mode of the touch sensor includes a first driving mode in which the plurality of nodes are simultaneously turned on to sense the touch input, and a second driving mode in which the plurality of nodes are sequentially turned on to detect the coordinate of the touch input when the touch input is sensed.

According to an embodiment, the controller may compare a whole electrical output change of the touch sensor generated in a state that the plurality of nodes are simultaneously turned on with a predetermined reference value to sense the touch input. The controller may sense each electrical output change at the plurality of nodes to recognize the coordinate of the touch input.

According to an embodiment, the touch sensor may include a plurality of sensing regions, and the controller may sum capacitance changes of the plurality of sensing regions to compute the total electrical output change to sense a touch input applied to boundaries between the plurality of sensing regions.

According to an embodiment, switching from the first driving mode to the second driving mode may be operated during an interval corresponding to any one frame of the display unit.

According to an embodiment, the touch sensor may be driven in the first driving mode unless there is a new touch input for a predetermined period of time subsequent to detecting the coordinate of the touch input in the second driving mode.

According to an embodiment, a driving period of time of the first driving mode may be shorter than that of the second driving mode.

According to an embodiment, the display unit and the touch sensor may form a touch screen, and the touch screen may be partitioned into a plurality of regions, and the controller may control the touch screen to display visual information while a partial region of the plurality of regions is in an inactive state.

The first driving mode may be operated prior to sensing the touch input while a partial region of the plurality of regions is in an inactive state.

When the touch input is sensed in the first driving mode, the first driving mode may be switched to the second driving mode, and the entire touch sensor may be activated.

Furthermore, according to the present disclosure, there is disclosed a control method of a mobile terminal having a touch screen, and the method may include turning on a display unit of the touch screen, and turning off the display unit and turning on a touch sensor of the touch screen, wherein the driving mode of the touch sensor includes a first driving mode in which a plurality of nodes of the touch sensor are turned on at the same time to sense the touch input; and a second driving mode in which the plurality of nodes are sequentially turned on to detect the coordinate of the touch input when the touch input is sensed.

According to the present disclosure, the touch screen may be controlled by dividing the steps of determining whether or not there is a touch and recognizing a coordinate thereof, thereby reducing the driving consumption power of the touch screen. More specifically, the touch screen may include a first driving mode in which a plurality of nodes are turned on at the same time to sense a touch input, and a second driving mode in which the plurality of nodes are sequentially turned on to detect the coordinate of the touch input. When the plurality of nodes are turned on at the same time, power loss may be reduced compared to a case where they are sequentially turned on, thereby reducing the driving consumption power of the touch screen.

For example, when the touch screen is in an active state, the scanning of unnecessary touch sensor may be prevented even when there is no touch, and determining whether or not there is a touch may be operated in a short period of time, thereby reducing the consumption power. In particular, in an in-cell type touch screen, all VCOM nodes connected to a MUX may be sensed at once without sequentially driving the MUX to compare it with a case where there is no touch, thereby efficiently determining whether or not there is a touch.

Furthermore, according to the present disclosure, when the plurality of nodes are turned on at the same time, it may be possible to reduce a touch sensing period of time. When there is no touch, a period of time required for touch sensing may be reduced to ¹/₁₀ compared to the related art, thereby increasing the standby power time, Furthermore, a period of time during which the display unit is driven in an on state may increase as the touch sensing period of time decreases, thereby increasing the brightness of the display unit.

In addition, according to the present disclosure, a first driving mode may be switched to a second driving mode within an interval corresponding to one frame, thereby sensing a touch coordinate within a short period of time. Moreover, such a driving method may be applicable to an in-cell type touch screen with an excellent touch response speed, thereby implementing a touch screen with a fast response speed with respect to a touch input.

Furthermore, according to the present disclosure, whether or not there is a touch may be determined using a whole electrical change of the touch screen in a first driving mode to efficiently cope with an environment in which a touch sensing sensitivity is reduced due to node separation according to the left, right, top and bottom on the in-cell type touch screen, thereby preventing a touch loss due to sensitivity reduction during the generation of a first touch.

Furthermore, according to the present disclosure, the touch screen may be driven in a first driving mode while part of the touch screen is in an inactive state and another part thereof displays visual information, thereby reducing the consumption of standby power at a new graphic user interface.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4A and 4B are conceptual views for explaining a touch sensor on a touch screen according to FIG. 3;

FIGS. 6, 7 and 8 are conceptual views for explaining a mode of driving a touch sensor according to the control method of the present disclosure.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
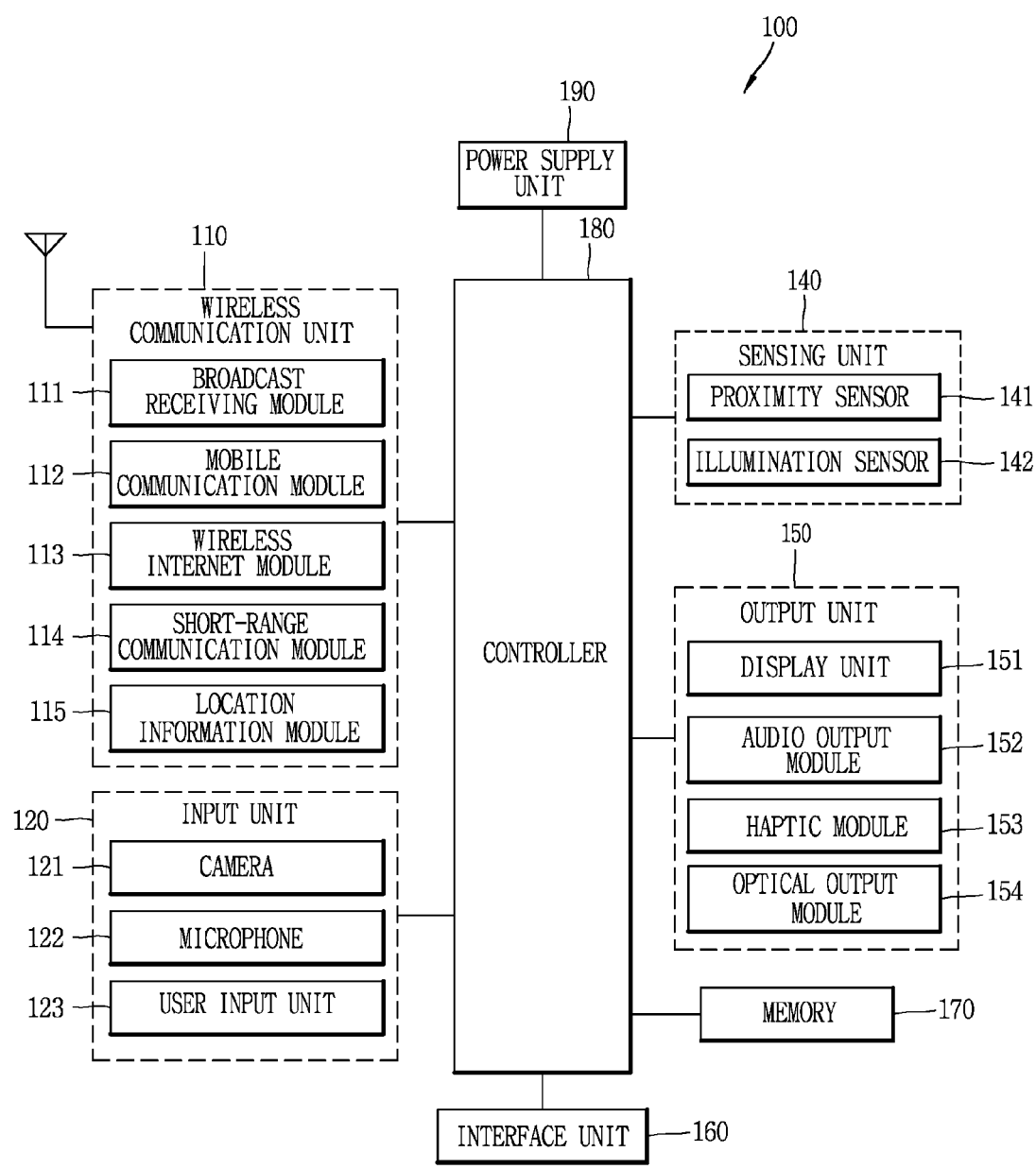
FIG. 1A is a block diagram for explaining a mobile terminal associated with the present disclosure.
Figure 1B:
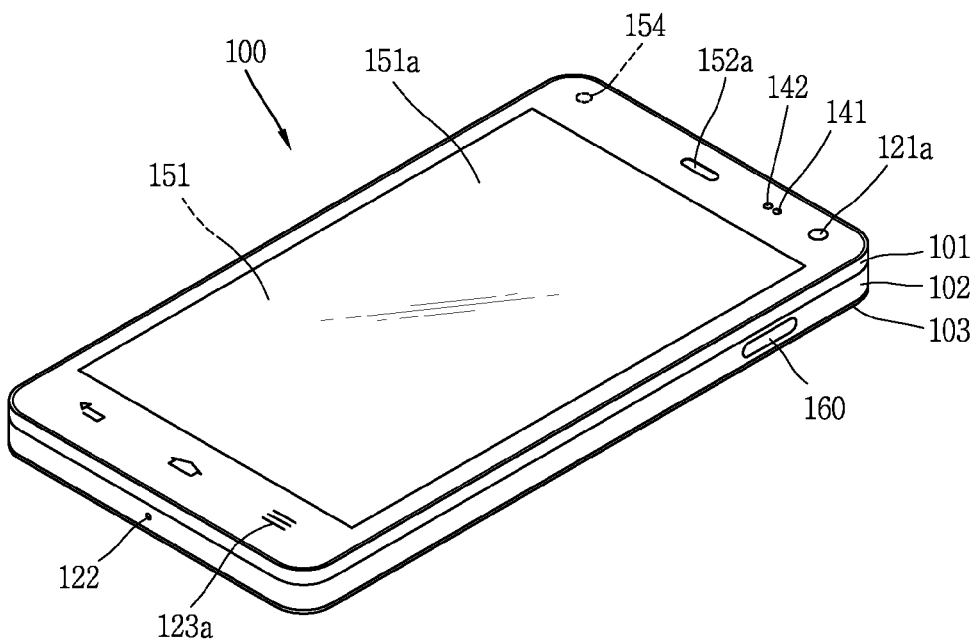
FIGS. 1B and 1C are conceptual views illustrating an example in which a mobile terminal associated with the present disclosure is seen from different directions.
Figure 1C:
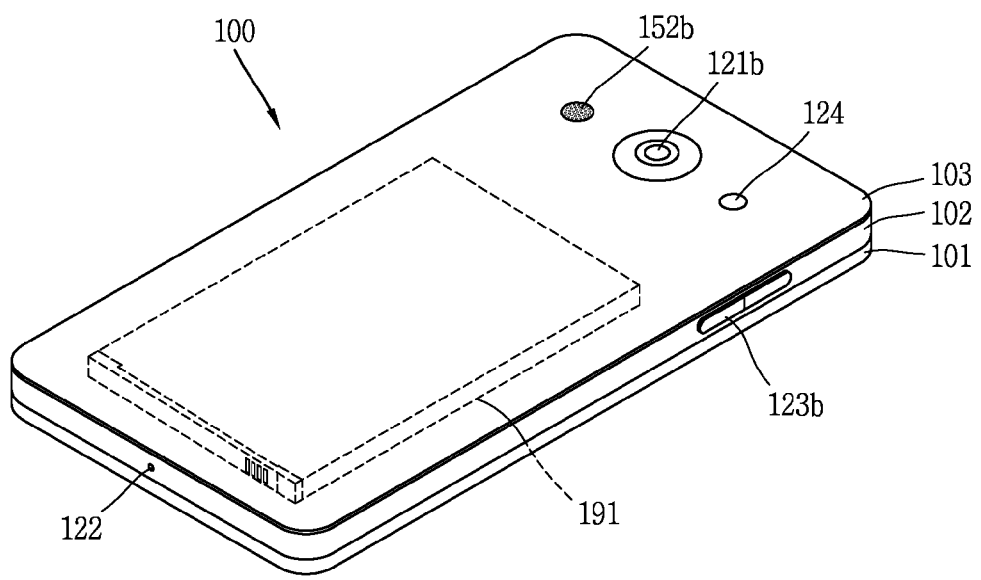

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.).

The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, smart glasses or a head mounted display (HMD), which is able to exchange data with the mobile terminal 100 (or to like data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a state of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description in association with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102.

A display unit 151 may be disposed on a front surface of the terminal body to output information. As illustrated, a window 151*a* of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like. Furthermore, the first and second manipulation units 123a and 123b may employ a method of perform manipulation without the user's tactile feeling through a proximity touch, a hovering touch or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, according to a mobile terminal of the present disclosure, the touch screen may be driven in a new method to reduce consumption power, and hereinafter, such a new method will be described in more detail with reference to the accompanying drawings.

An embodiment of the present disclosure will describe a new control method based on the structure of an in-cell type touch screen, but the present disclosure may not be necessarily limited to this. In other words, an embodiment described below will be applicable regardless of any type of mobile terminal if it is a structure or control method in which the touch sensor and the display unit are sequentially driven.

Figure 2:
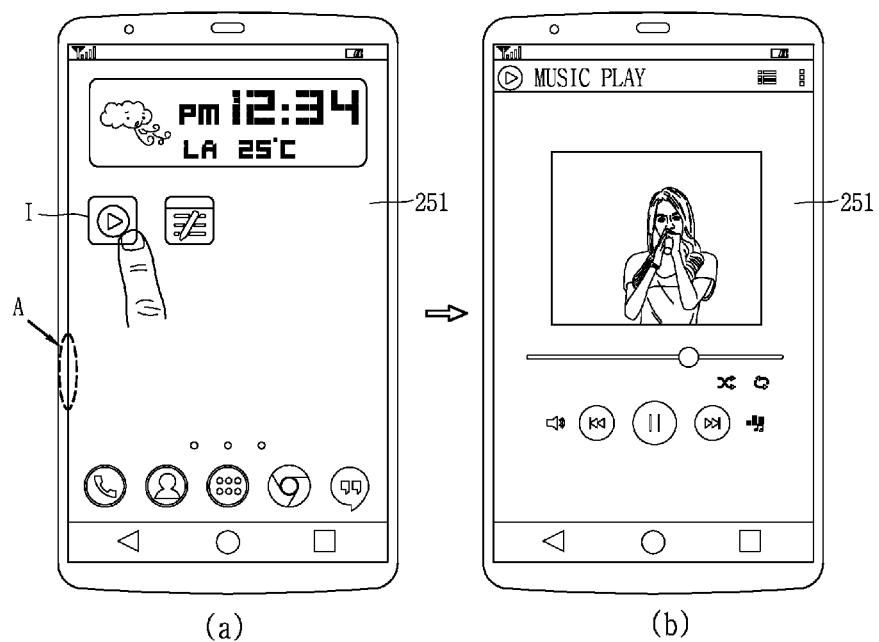
FIG. 2 is a conceptual view illustrating an example of a touch screen in a mobile terminal associated with the present disclosure.
Figure 3:
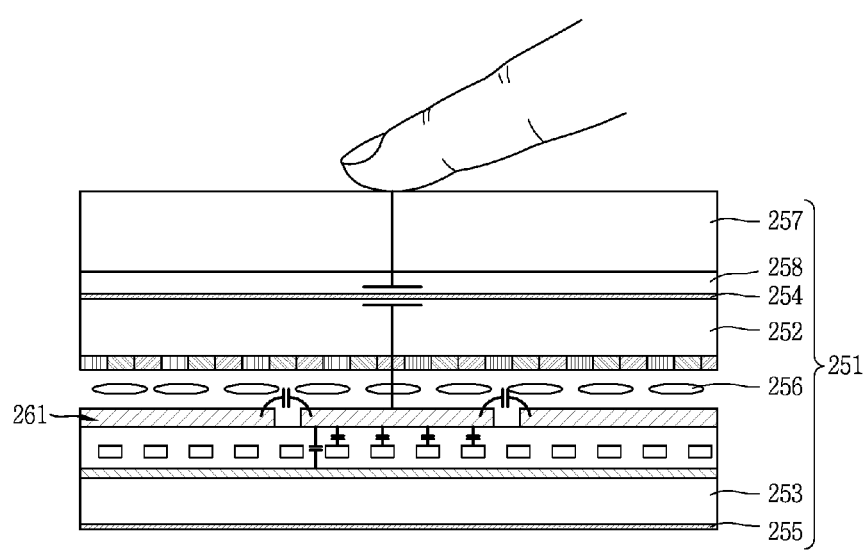
FIG. 3 is a cross-sectional view illustrating the structure of a touch screen in which portion "A" in FIG. 2 is enlarged.
Figure 4A:
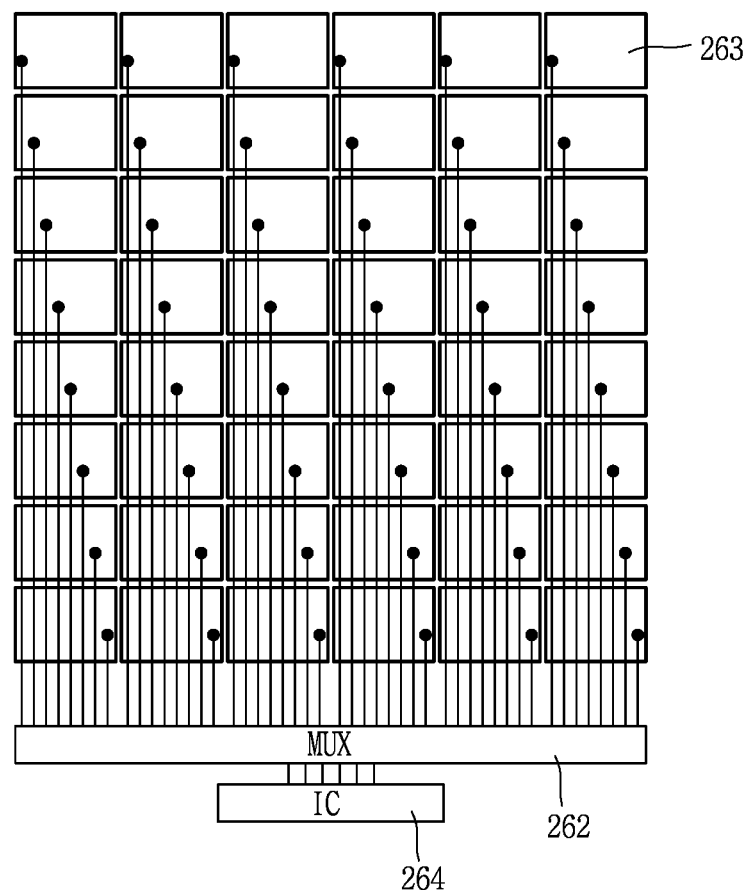

FIG. 2 is a conceptual view illustrating an example of a touch screen in a mobile terminal associated with the present disclosure, and FIG. 3 is a cross-sectional view illustrating the structure of a touch screen in which portion "A" in FIG. 2 is enlarged, and FIGS. 4A and 4B are conceptual views for explaining a touch sensor on a touch screen according to FIG. 3.

As illustrated in FIG. 2, when a touch input is applied to the touch screen, the controller (not shown) may process such a touch input to perform control corresponding to the processed touch input. For example, when a touch input is applied to any icon (I), an electrical change may be generated on the touch sensor as illustrated in FIG. 2A, and the controller may sense the electrical change to process the touch input and display the corresponding screen information on a display unit 251 as illustrated in FIG. 2B.

The electrical change may be a factor varying according to various touch modes such as a resistive mode, a capacitive mode, an infrared mode, an ultrasonic mode, a magnetic mode, and the like. For example, for the capacitive mode, the electrical change may be a change of an current or voltage output value on a touch sensor according to a change of capacitance. Hereinafter, the control method of the present disclosure will be described using a touch sensor with an in-cell type structure for sensing a touch in a capacitive mode as a specific embodiment.

For example, as illustrated in FIG. 3, a touch function is implemented within a cell of a liquid crystal display (LCD) with the in-cell type structure. More specifically, the display unit 251 may include a color filter (CF) glass 252 and a thin film transistor (TFT) glass 253 disposed to be separated from each other, a liquid crystal filled between the CF glass 252 and the TFT glass 253, and a polarizer 254 disposed on an upper surface of the CF glass 252. Furthermore, a polarizer 255 may be disposed on a rear surface of the TFT glass 253. The liquid crystal may be a display layer 256 configured to display visual information in reality. The CF glass 252 may be covered by a cover glass 257, and an optical clear adhesive (OCA), an optical clear resin (OCR), and the like may be disposed between the CF glass 252 and the cover glass 257 as an adhesive layer 258 for adhering them to each other. The display unit 251 may further include a backlight unit (not shown) for illuminating light toward the liquid crystal.

According to the drawing, an electrode layer 261 for driving the gate/source electrodes may be formed on an upper surface of the TFT glass 253. The electrode layer 261 may include a plurality of nodes, and supplies power to the display layer 256 to display visual information.

The electrode layer 261 may include a TFT layer (thin film transistor electrode layer) and a VCOM layer (common electrode layer). The touch sensor determines a capacitance formed between the VCOM layer and an object (for example, user's finger) to which a touch is applied, and each VCOM layer is partitioned and formed for each region corresponding to several millions of pixels.

As illustrated in FIGS. 4A and 4B, a number of each VCOM node is a number of touch nodes, and senses a capacitance change of the relevant VCOM node to determine whether or not there is a touch or touch coordinate. In other words, the touch sensor is disposed to overlap with the display layer, and formed to sense a touch input using the electrode layer. FIG. 4A illustrates a sensing node structure of the touch sensor, and FIG. 4B illustrates an example of the touch sensor configured with the MUXes 262 and VCOM nodes 263.

The touch sensing of the VCOM nodes 263 may include a circuit configuration capable of driving the relevant VCOM node 263 at an appropriate sensing frequency and sensing a charge change of the VCOM nodes 263. As illustrated in the drawing, for each of the VCOM nodes 263, several hundreds of lines are connected to a touch sensing circuit included in the in-cell driving driver IC 264 to sequentially sense the MUX according to a predetermined time and sense a capacitance change of each node.

As described above, in the in-cell type touch structure, VCOM lines for driving the display unit should be driven for touch sensing, and thus the display driving and touch sensing may be divided in terms of time.

In FIG. 4B, the structure of the MUX 262 and the VCOM nodes 263 are illustrated in more detail, wherein an embodiment configured with seven MUXes 262 on the left and the right, respectively, and configured with twenty VCOM nodes (or touch sensing nodes) 263 for each MUX is shown. In this case, it is possible to have a control of repeating the operation of sensing VCOM nodes (nodes 0-19) connected to MUX1 subsequent to driving several tens or several hundreds lines of display driving and then sensing the VCOM nodes (nodes 20-39) connected to MUX2 subsequent to driving next several tens or several hundreds lines of display driving within an interval corresponding to one frame. However, a time required for touch sensing is consumed during the process of repeating the display and the touch, and the entire nodes are sequentially sensed, thereby causing a problem of increasing the consumption power. As a result, the present disclosure presents a control method capable of solving such a problem. Hereinafter, such a control method will be described in more detail with reference to the accompanying drawings.

Figure 5:
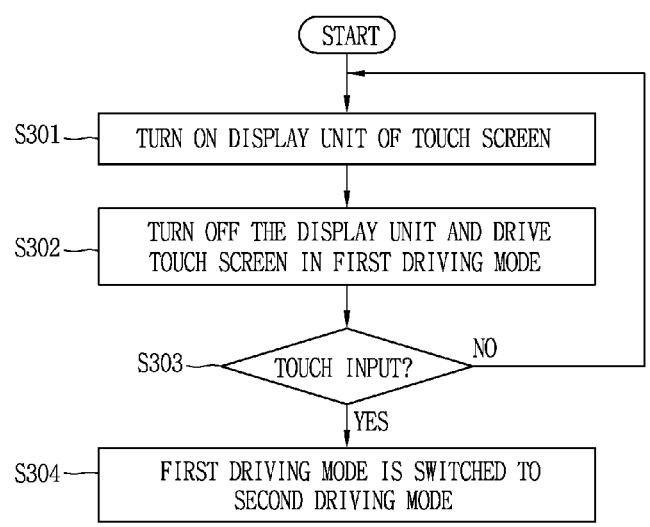
FIG. 5 is a flow chart representatively illustrating a control method of the present disclosure.
Figure 6:
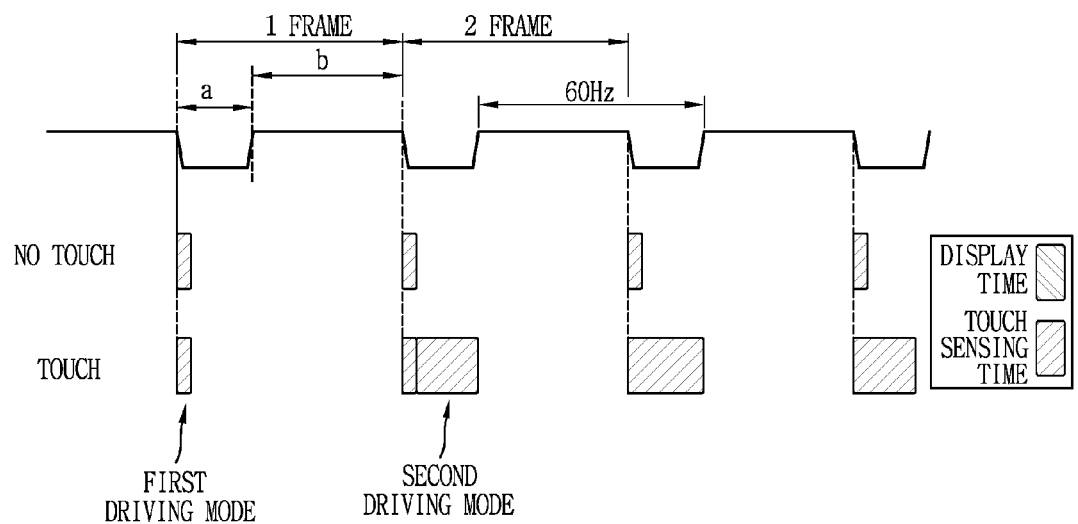
Figure 7:
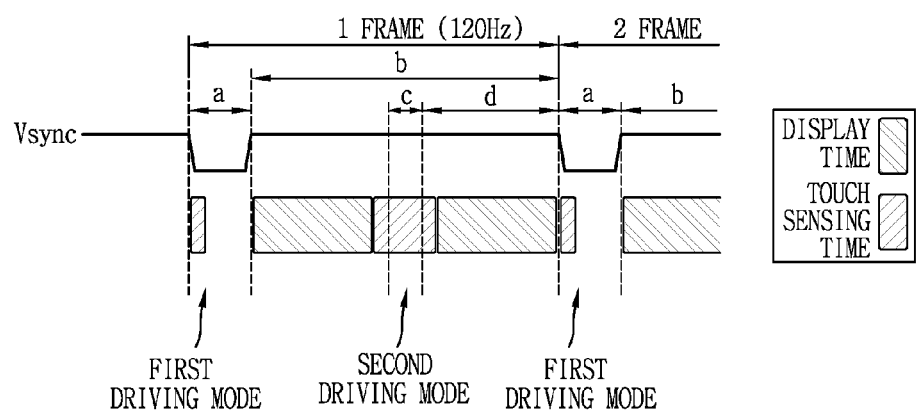

FIG. 5 is a flow chart representatively illustrating a control method of the present disclosure, and FIGS. 6, 7 and 8 are conceptual views for explaining a mode of driving a touch sensor according to the control method of the present disclosure.

First, in a mobile terminal according to the present disclosure, the driving mode of the touch sensor may include a first driving mode and a second driving mode.

The first driving mode may be a mode in which a plurality of nodes of the touch sensor are simultaneously turned on to sense a touch input. Furthermore, the second driving mode may be a mode in which the plurality of nodes are sequentially turned on to detect the coordinate of the touch input upon sensing the touch input. Furthermore, either one of the first driving mode and the second driving mode may be sequentially operated with the driving of the display.

More specifically, according to the drawing, first, the controller controls the display unit of the touch screen to be turned on (S301).

As the display unit is activated, visual information may be displayed on the touch screen. In this case, the entire touch screen may be activated to display the visual information. For another example, the touch screen is partitioned into a plurality of regions to display the visual information while a partial region of the plurality of regions is in an inactive state.

Next, the process (S302) of turning off the display unit and turning on the touch sensor of the touch screen is operated. In this case, the touch sensor may be controlled to execute the first driving mode.

When a user applies a touch input to visual information displayed on the touch screen, the touch sensor senses the application of the touch input (S303).

In this case, the controller compares a whole electrical output change of the touch sensor generated in a state that the plurality of nodes are turned on at the same time with a predetermined reference value to sense the touch input. In other words, as the process of determining whether or not there is a touch, the controller turns on all MUX selection signals and determine only whether or not there is a whole capacitance change.

To this end, all MUX signals connected to the VCOM nodes are turned on to determine whether or not there is a capacitance change through the driving of VCOM nodes.

However, the present disclosure may not be necessarily limited to this, and all nodes provided in the touch sensor unit may not be turned on, but a current may be supplied only to part of the nodes.

On the other hand, the predetermined reference value may be an ADC value entered to each channel when there is no touch input. In other words, the ADC value entered to each channel when there is no touch input may be stored as a reference value or baseline prior to the touch input. When there is the introduction of capacitance due to a touch input such as a finger or stylus pen, a capacitance increased prior to the touch is generated, and the controller may compare an ADC output value of each channel corresponding thereto with a baseline. The baseline may include a threshold value for determining a value above or below a predetermined value as a touch. In this manner, when there is an increase or decrease of capacitance, it is determined as a capacitance change on the touch screen to determine it as a touch.

In this case, the driving time of the first driving mode may be a period of time shorter than that of the second driving mode. For such an example, the driving time of the first driving mode may correspond to a driving time of any one of the plurality of nodes in the second driving mode. In this manner, only whether or not there is a touch input is determined in the first driving mode, and thus each MUX may not be required to be sequentially driven, and whether or not there is a touch may be sufficiently determined even when the extent of only one MUX sensing time is allocated thereto.

Next, when the touch sensor senses a touch input, the first driving mode is switched to the second driving mode (S304). Accordingly, the controller sequentially turns on a plurality of nodes to detect the coordinate of the touch input. In this manner, the driving of the touch sensor can be switched to the second driving mode only when there is a touch in the first driving mode.

However, a specific time interval may be applied to store the baseline of the second driving mode according to a temperature change and switch from the first driving mode to the second driving mode to track the baseline. The switching of the driving mode excluding such a case is limited only a case where a touch is generated, and the unnecessary driving of the second driving mode may be suppressed to prevent the unnecessary operation of the MCU or hardware, thereby enhancing the consumption power.

For a more specific example, the controller may sense an electrical output change at the plurality of nodes, respectively, to recognize the coordinate of the touch input.

In order to determine the touch coordinate, it may be sensed whether or not there is a capacitance change for each of the several hundreds of VCOM nodes. To this end, the MUXes are turned on once in a predetermined order, and a capacitance introduced to each channel is changed and determined with an ADC at the relevant MUX.

In this case, the controller may compare the each electrical output change with a reference different from the pre-determined reference value to recognize the coordinate of the touch input. In other words, a reference value during the process of determining whether or not there is a touch may vary during the process of detecting the coordinate.

More specifically, similarly to the process of determining whether or not there is a touch, the process of detecting a coordinate may include the processes of storing a baseline prior to the touch and the process of determining a capacitance change to determine whether or not an output value at the relevant node exceeds a predetermined threshold. In this case, when the output value exceeds a predetermined threshold, the process of recognizing the coordinate of the relevant touch position may be operated, and the threshold may be a different value from that of the process of determining whether or not there is a touch.

A sensing mode for determining the coordinate sequentially senses each MUX, and thus a sensing time thereof increases compared to the process of determining whether or not there is a touch. Furthermore, a computation for segmentation and coordinate change due to a touch may be operated for an additional computation according to the input ADC value and touch change amount.

In this manner, the first driving mode and the driving of the display unit may be sequentially operated prior to sensing the touch input, and when the touch input is sensed in the first driving mode, it is switched from the first driving mode to the second driving mode, thereby sequentially executing the second driving mode and the driving of the display unit.

At this time, when there no new touch input for a predetermined period of time subsequent to detecting the coordinate of the touch input in the second driving mode, the touch sensor may be driven in the first driving mode. Then, the driving of the display unit and the driving of the first driving mode may be sequentially operated.

As described above, a driving period of time of the first driving mode is shorter than that of the second driving mode, for example, about $\frac{1}{10}$. However, the application of the sensing time may vary according to the input time and environment of the relevant system.

In this manner, a touch sensor according to the present disclosure may be driven in a first driving mode (or rough scan mode, standby driving mode) for determining whether or not there is a touch input, and a second driving mode (or fine scan mode) for recognizing the touch coordinate of the touch input sensed through the first driving mode. The sensing time of the first driving mode is significantly decreased compared to that of the second driving mode, thereby reducing the consumed current. In particular, when each of the nodes is turned off at once, the power loss generated during the power on/off may be significantly reduced compared to a case where each of the nodes is sequentially turned on.

In this manner, the sensing time of the first driving mode is significantly decreased compared to that of the second driving mode, thereby reducing the consumed current. In particular, when each of the nodes is turned off at once, the power loss generated during the power on/off may be significantly reduced compared to a case where each of the nodes is sequentially turned on.

On the other hand, referring to FIG. 6, switching from the first driving mode to the second driving mode may be operated during an interval corresponding to any one frame of the display unit. The driving method of FIG. 6 may be applicable to both a case where touch sensing is operated at every 60 Hz and a case where touch sensing is operated at every 120 Hz subsequent to the driving of the display unit.

As described above, the display unit and the touch sensor are driven in a frame unit, and the touch sensor unit is not driven during an interval in which the display unit is driven, and on the contrary, the display unit is not driven during an interval in which the touch sensor is drive. In this manner, a display unit according to the present disclosure may allocate a touch sensing interval to a blank period of time in which the display unit is not driven, namely, the screen is not turned on, thereby reducing the effect of display noise during touch sensing.

On the other hand, the expression of the "frame unit" in the present disclosure denotes a time unit consumed to implement one frame, and may be an interval corresponding to the foregoing any one frame. For example, when a period of time of 0.001 second is consumed to implement one frame, the display unit and the touch sensor may be alternately driven in an on state within 0.001 second. A period of time defined by one frame is determined by 1 second/a number of frames. For example, the display unit configured to display 60 frames per second (60 Hz) may have a period of time of about 16.6 milliseconds (ms).

In a mobile terminal according to the present disclosure, the controller drives the touch sensor in a first interval (a) and drives the display unit in a second interval (b) for each frame, wherein during a display unit driving interval, when a touch input is sensed in the first driving mode, the second driving mode is operated in the corresponding interval.

More specifically, the controller may drive the touch sensor in an on state during the first interval (a) and drive the display unit in an off state in the frame unit, and drive the touch sensor in an off state and drive the display unit in an ON state during the second interval (b) different from the first interval (a). As illustrated in FIG. 6, the touch sensor is driven in the first driving mode until prior to sensing a touch input, and driven in the second driving mode at the remaining portion excluding a portion corresponding to the first driving mode during the first interval (a) when the touch input is sensed.

As described above, according to the present embodiment, when there is a touch, switching between the first driving mode and the second driving mode may be operated within one frame to enhance the response speed. Furthermore, coordinate determination due to a change of capacitance generated from any frame is operated within the relevant frame, thereby reducing the response speed.

However, the present disclosure may not be necessarily limited to this. For example, when the touch input is sensed while the touch sensor is driven in the first driving mode during the first interval (a), the controller may drive the touch sensor in the second driving mode during the first interval of a second frame following a first frame during which the touch input is sensed to detect a touch coordinate of the touch input. Meanwhile, the touch sensor may be operated only in the second driving mode during the second frame, and in this case, the touch sensor may not be operated in the first driving mode during the second frame. Accordingly, in this case, information on one touch for two frames may be acquired. In other words, an accurate touch coordinate for one touch may be produced over two frames. More specifically, information on whether or not there is a touch may be acquired during the first frame, and the touch coordinate information of the touch may be acquired during the second frame.

For another example, switching from the first driving mode to the second driving mode may be operated during an interval corresponding to the driving of the display unit. Hereinafter, such an example will be described based on a case where touch sensing is operated at every 120 Hz.

More specifically, referring to FIG. 7, when a touch input is sensed while driving the touch sensor in the first driving mode during the first interval (a), the controller may control the touch sensor and display unit to detect the touch coordinate of the touch input during the second interval during which the display unit is driven within a frame during which the touch input is sensed. In other words, when a touch input is sensed during the first interval (a), the controller uses the second interval (b), which is a driving interval of the display unit, to detect the touch coordinate of the sensed touch input within a frame during which the touch input is sensed.

At this time, the controller suspends the driving of the display unit during the second interval (b), and drives the touch sensor in the second driving mode during a partial interval of the second interval (b) to detect the touch coordinate of the touch input. Furthermore, the controller drives the display unit again during the remaining interval (d) of the second interval (b) subsequent to ending the detection of the touch coordinate. During the remaining interval (d), the touch sensor is driven in an off state.

In other words, the controller drives the display unit in an off state while driving the touch sensor in an on state during the second interval (b), and switches the touch sensor to an off state during the remaining interval (d) of the second interval (b) when the detection of the touch coordinate is completed during the second interval (b), and drives the display unit again in an on state. In this manner, when the detection of a touch input and the detection of a touch coordinate are operated at once, it may be possible to enhance the touch response speed.

On the other hand, when a touch input is not sensed during a frame following the frame, it may be possible to end the second driving mode, and execute the first driving mode.

As described above, a touch screen according to the present disclosure may be configured to reduce the consumption power and increase the response speed for a touch input.

On the other hand, referring to FIG. 8, the touch sensor may be driven in a control method capable of enhancing the touch sensitivity in the first driving mode.

For example, the touch sensor may include a plurality of sensing regions. As illustrated in FIGS. 4A and 4B, even in the present embodiment, the structure of the MUXes 262 and VCOM nodes (or touch sensing nodes) 263 is illustrated in more detail, and an embodiment configured with seven MUXes 262 on the left and the right, respectively, and configured with twenty VCOM nodes 263 for each MUX is shown. The first sensing region 265a and the second sensing region 265b may be disposed on the left and the right of the touch sensor, but the present disclosure may not be necessarily limited to this. For example, the sensing region may be disposed on the top and the bottom of the touch sensor or disposed on the top, the bottom, the left and the right thereof. Furthermore, boundaries between the plurality of sensing regions may be operated in various ways, and the size of the sensing region may be modified in various ways.

In this case, the controller may sum capacitance changes of the plurality of sensing regions to compute the total electrical output change to sense a touch input applied to boundaries between the plurality of sensing regions.

As illustrated in the drawing, when a touch input (T1) is applied to the center of the touch sensor in a structure divided into the left and the right to introduce a capacitance to different channels on the left and the right, the sensitivity thereof will be reduced compared to when one complete touch node is touched. In other words, when a touch input is applied to a boundary between the first sensing region 265a and the second sensing region 265b, the sensitivity for sensing a touch input is reduced in each region. Furthermore, even in one sensing region, it is similar to a case where a plurality of VCOM nodes are touched at the same time (for example, a central portion of the partitioned portion is touched (T2)). In this case, the distinction between a noise level and a touch level according to a threshold value is not clear, and thus it is difficult to optimize the threshold value when determining whether or not there is a touch. In order to solve the foregoing problem, the present embodiment may additionally execute the processes of summing the output values of the left and the right node and summing the output values of the top and the bottom node.

The touch sensing of the first driving mode determines whether or not there is a touch, and thus the recognition of a specific location is not important, thereby allowing a circuit configuration of determining only whether or not the output value exceeds the threshold. Accordingly, when the results of sensing touch nodes on the left, the right, the top and the bottom are summed to determine whether or not it exceeds the threshold as illustrated in the present embodiment, it may be possible to increase the signal to noise ratio (SNR). When the cover glass becomes thick to protect the display, a signal level to the touch input decreases, and thus the summing method of the present embodiment allows efficient determination of whether or not there is a touch.

According to the foregoing control method of the present disclosure, it may be possible to implement a touch screen capable of reducing the consumption power, increasing a response speed with respect to a touch input, and increasing the sensing sensitivity.

On the other hand, the control method of the present disclosure may implement new user interfaces in connection with the output of visual information on the display unit. Hereinafter, an embodiment associated with the implementation of such new user interfaces will be described in more detail with reference to the accompanying drawings.

Figure 9:
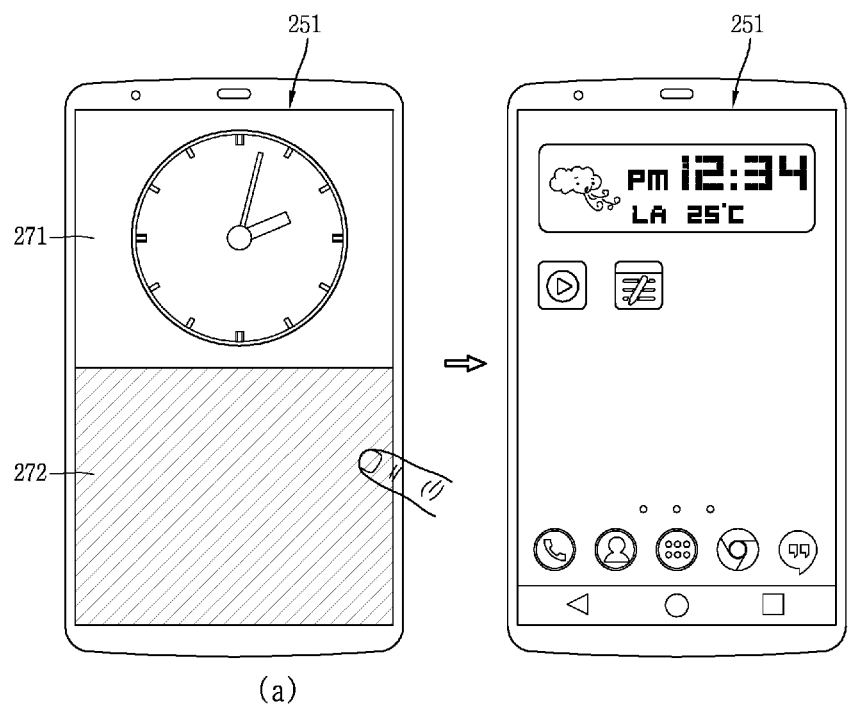
FIGS. 9 and 10 are conceptual views illustrating embodiments in which the control method of the present disclosure is implemented in a mobile terminal.
Figure 10:
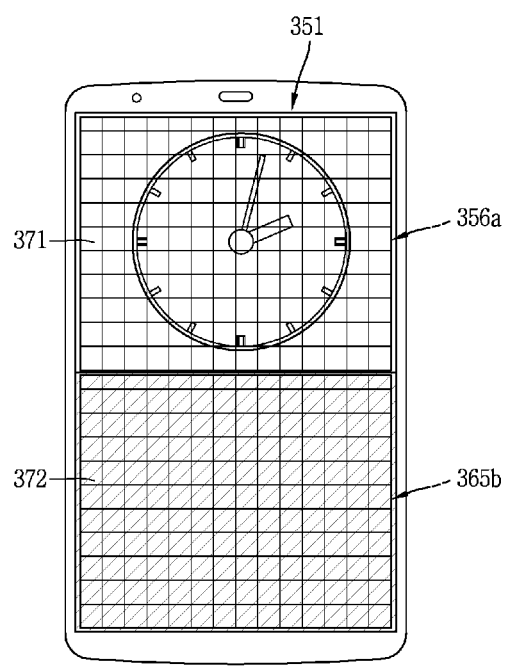

FIGS. 9 and 10 are conceptual views illustrating embodiments in which the control method of the present disclosure is implemented in a mobile terminal.

Referring to FIG. 9, the touch screen may be partitioned into a plurality of regions 271, 272, and the controller may control the touch screen to display visual information while a partial region of the plurality of regions is in an inactive state.

For example, the plurality of regions may include a first region and a second region 271, 272, and the controller controls the touch screen to display the first and the second region 271, 272 excluding the second region 272. Here, the inactive state denotes a state in which the illumination of the display unit is off.

The visual information may be an icon or widget set by a user, for example, and for an example of the icons, a clock may be displayed as illustrated in the drawing. For another example, the visual information may be a call log, execution of a front camera, text, SNS execution, and the like. For still another example, the visual information may be an icon of executing a specific application such as quick memo execution.

On the other hand, the display unit of the mobile terminal may operate in a specific mode in which the minimum current or power is consumed even in an inactive state, namely, a locked state as a whole. Such a specific mode may be referred to as a "doze mode." For example, the doze mode may be a state in which only the light emitting devices are off, and the touch sensors maintains an on state.

As illustrated in the present embodiment, a mode in which only part of the display unit 251 of the touch screen is activated may be a semi-doze mode in which the mobile terminal displays specific information on an ongoing basis without consuming a lot of consumption power. In this case, the user may check a time using the clock or apply a touch input to the icon to execute a specific application in a semi-doze mode. For another example, it may be also possible to apply a tap to the display unit 251 to activate the entire display unit 251.

On the other hand, the first driving mode of the touch sensor may be operated prior to sensing the touch input while a partial region of the plurality of regions is in an inactive state. In other words, the touch screen operates in the first driving mode until prior to sensing a touch input in a semi-doze mode.

When the touch input is sensed in the first driving mode, the first driving mode may be switched to the second driving mode, and the whole of the touch screen may be activated. The touch input may be applied to the second region 272 in which the display unit 251 is in an inactive state as illustrated in the drawing, but the present disclosure may not be necessarily limited to this. For example, when the touch input is applied to the first region 271 in which the display unit 251 is in an active state, switching from the first driving mode to the second driving mode may be operated.

Furthermore, even when switching from the first driving mode to the second driving mode is operated, the display unit 251 may still activate only the first region 271. In this case, when a plurality of tap inputs applied to the display unit 251 match a predetermined pattern, the entire touch screen may be activated.

More specifically, when the touch input is sensed in the first driving mode, visual information is displayed on the entire screen of the display unit 251, and the touch sensor is driven in the second driving mode. For example, a lock screen may be displayed or a home screen page may be displayed on the entire screen of the display unit 251.

In a state that the lock screen is displayed (or lock mode), the touch sensor may be in a state of allowing only a touch input associated with the operation of releasing a locked state. Furthermore, the lock screen may be displayed when the terminal is set to use a lock function.

Here, the home screen page may be expressed as an idle screen, and may be displayed on the touch screen when the terminal is in an idle state. An icon or widget of an application installed on the mobile terminal may be displayed on the home screen page. Furthermore, a plurality of home screen pages may be provided according to the user's selection or a number of applications installed on the terminal.

In this case, when there is no touch input with respect to the entire screen for a predetermined period of time or a user's input is applied to a specific key, a semi-doze mode may be operated again. At this time, the touch sensor may operate in the first driving mode again.

On the other hand, referring to FIG. 10, the touch sensor may include a plurality of sensing regions corresponding to a plurality of regions, respectively, on the touch screen.

The plurality of sensing regions may be a region additionally provided with the structure of MUXes and VCOM nodes as illustrated in FIGS. 4A, 4B and 8, and may be disposed on the top and the bottom, on the left and the right, or on the top, the bottom, the left and the right, respectively. According to the present embodiment, it is illustrated a case where a first sensing region and a second sensing region 365a, 365b are disposed on the top and the bottom of the touch sensor.

A plurality of regions of the touch screen may include a first region and a second region 371, 372 disposed on the top and the bottom of the display unit. The first region 371 is a region activated in a semi-doze mode, and may be a region corresponding to the first sensing region 365a of the touch sensor. On the contrary, the second region 372 as a region deactivated in a semi-doze mode may be a region corresponding to the second sensing region 365b of the touch sensor.

In this case, the first sensing region and the second sensing region 365a, 365b of the touch sensor may be operated in the first driving mode in the semi-doze mode, and switched to the second driving mode when a touch input applied to the touch screen is sensed.

For another example, in the semi-doze mode, the first sensing region 365a of the touch sensor may be operated in the first driving mode, and the second sensing region 365b may maintain a state that each of the nodes is off. Accordingly, the touch sensor may sense only a touch input applied to the first region 371, and when the touch input applied to the 371 is sensed, it may be operated in the second driving mode on the whole of the first sensing region and the second sensing region 365a, 365b. According to such a control method, it may be possible to allow the driving of the touch screen in which a touch input is enabled only in a region in which visual information is displayed in the semi-doze mode.

In the above, a user interface in which the first driving mode is operated while part of the display unit is in an active state in addition to a case where the first driving mode is operated while the entire display unit is in an active state (refer to FIG. 2) has been described. However, the present disclosure may not be necessarily limited to a case where the first driving mode is operated while at least part of the display unit is in an active state as described above.

For example, the first driving mode of the touch sensor may be operated prior to sensing the touch input in a doze mode in which the display unit is in an inactive state. In other words, the touch sensor may operate in the first driving mode until prior to sensing a touch input in a doze mode. When the touch input is sensed in the first driving mode, switching from the first driving mode to the second driving mode may be operated. The whole of the touch screen may be activated.

Furthermore, even when switching from the first driving mode to the second driving mode is operated, the display unit may be continuously deactivated. For such an example, the touch sensor may be driven in the first driving mode until prior to entering a first touch input in a doze mode, but switched to the second driving mode when a second touch input is entered. When a plurality of touch inputs match a specific pattern, the display unit may be activated. In this case, a lock screen may displayed or a home screen page may be displayed on the entire screen of the display unit.

According to a new user interface described above, it may be possible to implement a mobile terminal capable of continuously displaying visual information while at the same time as well as reducing the consumption power.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
   a display provided with an electrode layer having a plurality of nodes, and a display layer configured to receive power from the electrode layer and display visual information;
   a touch sensor disposed to overlap with the display layer to sense a touch input using the electrode layer; and
   a controller configured to control power supplied to the electrode layer to control the display and the touch sensor,
   wherein a driving mode of the touch sensor comprises:
      a first driving mode in which the plurality of nodes are simultaneously turned on to sense the touch input; and
      a second driving mode in which the plurality of nodes are sequentially turned on to detect a coordinate of the touch input when the touch input is sensed, and
   wherein
      the display and the touch sensor form a touch screen,
      the touch screen is partitioned into a plurality of regions including a first region and a second region, and
      the controller controls the touch screen to display visual information on the first region and the display to turn off illumination of the second region simultaneously with the first driving mode.

2. The mobile terminal of claim 1, wherein the controller compares a total electrical output change of the touch sensor generated in a state that the plurality of nodes are simultaneously turned on with a predetermined reference value to sense the touch input.

3. The mobile terminal of claim 2, wherein the controller senses each electrical output change at the plurality of nodes to recognize the coordinate of the touch input.

4. The mobile terminal of claim 3, wherein the controller compares each of the electrical output changes with a reference value different from the predetermined reference value to recognize the coordinate of the touch input.

5. The mobile terminal of claim 2, wherein the touch sensor comprises a plurality of sensing regions, and
   the controller sums capacitance changes of the plurality of sensing regions to compute a total electrical output change to sense when the touch input is applied to one or more boundaries between the plurality of sensing regions.

6. The mobile terminal of claim 1, wherein the first driving mode and driving of the display are sequentially performed prior to sensing the touch input.

7. The mobile terminal of claim 6, wherein when the touch input is sensed in the first driving mode, the first driving mode is switched to the second driving mode, and the second driving mode and the driving of the display are sequentially performed.

8. The mobile terminal of claim 7, wherein switching from the first driving mode to the second driving mode is performed during an interval corresponding to any one frame of the display.

9. The mobile terminal of claim 1, wherein the touch sensor is driven in the first driving mode unless there is a new touch input during a predetermined period of time subsequent to detecting the coordinate of the touch input in the second driving mode.

10. The mobile terminal of claim 1, wherein a driving period of time of the first driving mode is shorter than that of the second driving mode.

11. The mobile terminal of claim 10, wherein a driving period of time of the first driving mode corresponds to any one driving period of time of the plurality of nodes in the second driving mode.

12. The mobile terminal of claim 1,
    wherein the controller controls the touch screen to display visual information while at least one of the plurality of regions is in an inactive state.

13. The mobile terminal of claim 12, wherein the first driving mode is performed prior to sensing the touch input while the at least one of the plurality of regions is in the inactive state.

14. The mobile terminal of claim 13, wherein when the touch input is sensed in the first driving mode, the first driving mode is switched to the second driving mode, and the entire touch sensor is activated.

15. The mobile terminal of claim 13, wherein the touch sensor comprises a plurality of sensing regions corresponding to the plurality of regions, respectively, on the touch screen.

16. A control method of a mobile terminal having a touch screen, the method comprising:
   turning on a display of the touch screen; and
   turning off the display and turning on a touch sensor of the touch screen,
   wherein a driving mode of the touch sensor comprises:
      a first driving mode in which a plurality of nodes of the touch sensor are turned on at the same time to sense the touch input; and
      a second driving mode in which the plurality of nodes are sequentially turned on to detect a coordinate of the touch input when the touch input is sensed,
   wherein the display and the touch sensor form a touch screen,
      the touch screen is partitioned into a plurality of regions including a first region and a second region, and
      wherein the method further includes controlling the touch screen to display visual information on the first region and the display to turn off illumination of the second region simultaneously with the first driving mode.

17. The method of claim 16, wherein an electrical output change of the touch sensor generated in a state that the plurality of nodes are turned on at the same time is compared with a predetermined reference value to sense the touch input.

18. The method of claim 17, wherein each electrical output change at the plurality of nodes is sensed to recognize the coordinate of the touch input.

19. The method of claim 16, wherein switching from the first driving mode to the second driving mode is performed during an interval corresponding to any one frame of the display.

20. The method of claim 16, wherein the touch screen is controlled to display visual information and execute the first driving mode while at least one of the plurality of regions is in an inactive state.

21. A mobile terminal, comprising:
   a display provided with an electrode layer having a plurality of nodes, and a display layer configured to receive power from the electrode layer and display visual information;
   a touch sensor disposed to overlap with the display layer to sense a touch input using the electrode layer; and
   a controller configured to control power supplied to the electrode layer to control the display and the touch sensor,
   wherein a driving mode of the touch sensor comprises:
      a first driving mode in which the plurality of nodes are simultaneously turned on to sense the touch input; and
      a second driving mode in which the plurality of nodes are sequentially turned on to detect a coordinate of the touch input when the touch input is sensed, and
   wherein
      the display and the touch sensor form a touch screen,
      the touch screen is partitioned into a plurality of regions including a first region and a second region,
      the controller controls the touch screen to display visual information on the first region and the display to turn off illumination of the second region in the first driving mode, and
      the plurality of nodes that are simultaneously turned on during the first driving mode are located in the second region.

* * * * *